United States Patent [19]

Lubieniecki

[11] Patent Number: 4,613,281

[45] Date of Patent: Sep. 23, 1986

[54] HYDRODYNAMIC SEAL

[75] Inventor: Valdemar M. Lubieniecki, Skaneateles, N.Y.

[73] Assignee: Goulds Pumps, Incorporated, Seneca Falls, N.Y.

[21] Appl. No.: 587,594

[22] Filed: Mar. 8, 1984

[51] Int. Cl.[4] .............................................. F04D 29/08
[52] U.S. Cl. ................................. 415/170 B; 415/87; 415/98; 415/176
[58] Field of Search ................ 415/170 B, 86, 87, 98, 415/131, 140, 175, 176, 206, 172 R, 52, 53, 53 T, 59, 198.2

[56] References Cited

U.S. PATENT DOCUMENTS

| 2,818,227 | 12/1957 | Suss | 253/26 |
|---|---|---|---|
| 3,171,357 | 2/1962 | Egger | 415/206 |
| 3,246,874 | 4/1966 | Sproule | 415/172 R |
| 3,360,238 | 12/1967 | Koeller et al. | 415/175 |
| 3,402,671 | 9/1968 | Wilfley et al. | 415/24 |
| 3,580,588 | 5/1971 | Allen et al. | 277/32 |
| 3,711,218 | 1/1973 | Kennel et al. | 415/131 |
| 3,741,679 | 6/1973 | Johnston | 415/53 X |
| 3,792,935 | 2/1974 | Randell | 415/110 |
| 3,824,029 | 7/1974 | Fabri et al. | 415/109 |
| 3,881,840 | 5/1975 | Bunjes | 415/109 |
| 3,944,406 | 3/1976 | Jagusch et al. | 55/407 |
| 4,037,985 | 7/1977 | Karassik et al. | 415/175 |
| 4,057,361 | 11/1977 | Renaud | 415/53 R |
| 4,212,585 | 7/1980 | Swarden | 415/53 R |
| 4,242,039 | 12/1980 | Villard et al. | 415/112 |
| 4,277,222 | 7/1981 | Barbeau | 415/172 R X |
| 4,378,196 | 3/1983 | Leskinen | 415/98 X |
| 4,521,151 | 6/1985 | Frater et al. | 415/170 B |

FOREIGN PATENT DOCUMENTS

| 691148 | 4/1940 | Fed. Rep. of Germany | 415/175 |
|---|---|---|---|
| 725246 | 9/1942 | Fed. Rep. of Germany | 415/175 |
| 239815 | 11/1945 | Fed. Rep. of Germany | 415/175 |
| 867933 | 3/1953 | Fed. Rep. of Germany | 415/172 R |
| 32406 | 3/1978 | Japan | 415/172 R |
| 62203 | 6/1978 | Japan | 415/170 B |
| 153221 | 5/1954 | Netherlands | 415/170 B |
| 108779 | 2/1925 | Switzerland | 415/170 B |
| 587372 | 4/1947 | United Kingdom | 415/170 B |
| 885615 | 11/1981 | U.S.S.R. | 415/170 B |

OTHER PUBLICATIONS

Nelson, "Power Mate", Liquid Drive Literature.

Primary Examiner—Everette A. Powell, Jr.
Attorney, Agent, or Firm—Bean, Kauffman & Bean

[57] ABSTRACT

A fluid pump is provided with a casing having a pumping chamber, an impeller arranged within the pumping chamber, a vortex chamber arranged to open inwardly of the pumping chamber and a repeller carried by the impeller and arranged to extend into the vortex chamber; the repeller and vortex chambers cooperating to create a toroidal flow of fluid within the vortex chamber incident to rotation of the impeller.

21 Claims, 7 Drawing Figures

HYDRODYNAMIC SEAL

BACKGROUND OF THE INVENTION

In centrifugal pumps, it is common practice to provide front sealing means adapted to provide a seal between the front of an impeller and a front of a pump casing in a region bounding an inlet or suction opening and rear sealing means adapted to provide a seal between the rear of such impeller or its drive shaft and a rear of the pump casing for purposes of minimizing leakage of pumped fluid subject to high discharge pressure adjacent an outlet or discharge opening past the impeller towards the inlet opening and to atmosphere through the impeller shaft supporting bearings and stuffing box of the pump.

One widely used type of rear sealing means comprises a plurality of back, pump out or repeller blades, which are formed integrally with the rear surface of the impeller and arranged to cooperate with an annular surface of the casing rear wall to create a hydrodynamic seal. The facing or cooperating surfaces of the pump casing and the blades must be machined to relatively close tolerances and care must be exercised in pump design and construction to provide for a relatively small axial gap or spacing between such surfaces in order to obtain maximum efficiency of operation. It is well known that the efficiency or effectiveness of the seal is very sensitive to the size of the axial gap between cooperating surfaces of the casing and blades, and that even a small increase in the latter, due for instance to differential thermal expansion of the casing and the impeller or its drive shaft, will result in a marked reduction in seal efficiency.

The problem of maintenance of rear seal efficiency is particularly serious in a pump intended for use in handling fluids containing abrasive materials. In this respect, a pump of this type is typically provided with suitable means for adjustably moving its impeller axially towards its pump inlet opening, as required to compensate for the wearing away of casing and/or impeller surfaces defining its front sealing means. Thus, with each adjustment of the impeller the spacing between the cooperating surfaces of the repeller blades and the casing rear wall is increased with a corresponding steady reduction in the efficiency of the rear seal. As a result, the repeller blades cannot maintain a dry seal or provide for a steady predetermined reduction of the axial thrust to which the impeller shaft bearings are subjected.

SUMMARY OF THE INVENTION

The present invention is directed towards a pump provided with an improved hydrodynamic seal and more particularly to a hydrodynamic seal which is relatively insensitive to variations in axial spacing between its cooperating elements.

The present hydrodynamic seal is defined by an annular vortex chamber or channel, which opens into a pumping chamber of a pump casing through a rear wall thereof and is disposed concentrically of the rotational axis of an impeller arranged within the pumping chamber; and a repeller which is carried by the impeller and arranged to extend rearwardly thereof for receipt within the vortex chamber. The vortex chamber is bounded by inner and outer generally cylindrically shaped walls disposed concentrically of the rotational axis of the impeller and an annular end or rear wall of concave configuration arranged to extend between or join the inner and outer walls. The repeller of the present invention is defined by an annular rib, which is carried by the impeller and disposed to extend rearwardly of the rear wall or surface thereof; and a plurality of blades, which are carried by the annular rib and disposed to extend rearwardly thereof.

As an incident to driven rotation of an impeller fitted with the present repeller rib and blades, pump fluid within the vortex chamber is forced to move radially outwardly towards the outer wall or periphery of the vortex chamber within the passages bounded by the blades, due to the energy gradient established by the difference between the peripheral velocities of the inner and outer edges of the blades. Fluid exiting from the outer ends of the blade passages serves to energize fluid in the open portion of the vortex chamber, which extends between its end or rear wall and the rear edges of the blades, and results in a radially inwardly directed movement of fluid within such open portion for reentry into the inner ends of the blade passages. This generally radially directed fluid circulation pattern is superimposed on a peripherally or annularly directed fluid circulation pattern resulting from the rotational movement of the blades to create a toroidal flow of fluid within the vortex chamber, which is effective in establishing a hydrodynamic seal tending to prevent the flow of high pressure pump fluid radially inwardly between the rear wall of the pump casing and the rear wall of the impeller towards the impeller drive shaft. Fluid in the open portion of the vortex chamber is energized in an efficient way similar to that occurring in a hydraulic coupling and therefore involves little expenditure of additional energy to drive the pump shaft.

The present hydrodynamic seal may selectively be employed to establish a dry seal or simply to provide for a predetermined reduction in pressure conditions existing in the area of the pump shaft stuffing box. A dry seal may be obtained in pump installations, wherein pump inlet pressure is below atmospheric pressure, or for other pump inlet conditions by providing pumping vanes of an impeller with an outer diameter less than that of the repeller.

The hydrodynamic seal of the present invention possesses the advantage over seals established by known back or pump out blade constructions in that it is relatively insensitive to variation in initial axial spacing between its cooperating elements. As a result, the facing surfaces of the elements of the present seal need not be machined or otherwise formed to the same degree of tolerance, nor need the same degree of care be exercised in the placement of such elements at the time of manufacture, thereby providing for a substantial reduction in initial construction costs without loss in subsequent operating efficiency.

Further, the insensitivity of the present seal to relatively substantial variations in axial spacing between its elements renders it particularly adapted for use in corrosive fluid pumps, wherein their impellers are required to undergo periodic axial adjustments to compensate for the wearing away of their front or inlet seals.

DRAWINGS

The nature and mode of operation of the present invention will now be more fully described in the following detailed description taken with the accompanying drawings wherein.

DETAILED DESCRIPTION

Figure 1:
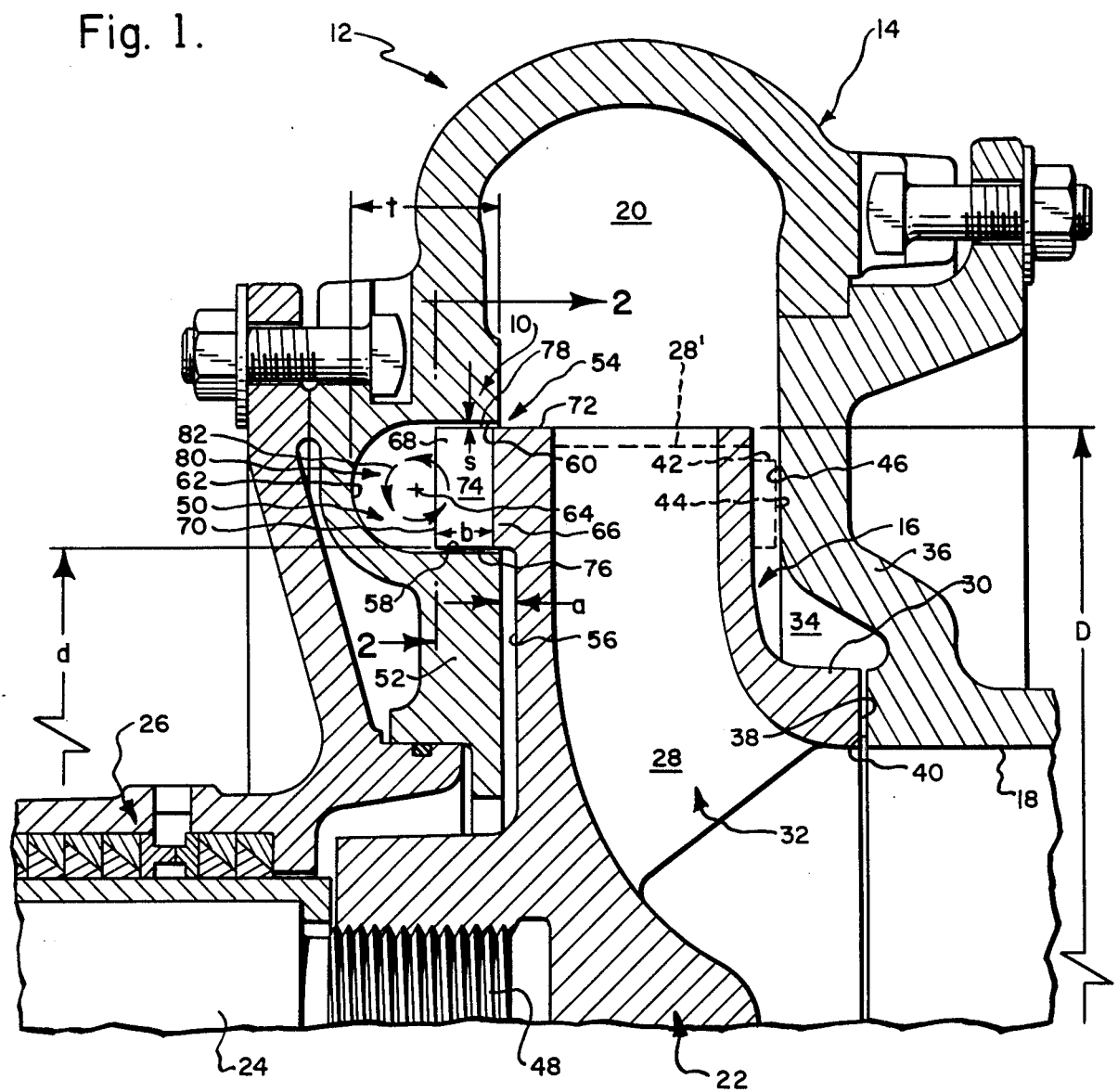
FIG. 1 is a sectional view of a centrifugal pump provided with a hydrodynamic seal formed in accordance with the present invention.

Reference is first made to FIG. 1, wherein a hydrodynamic seal formed in accordance with the present invention is generally designated as 10 and shown in association with a centrifugal pump 12 of otherwise known construction.

To facilitate understanding of the present invention and the advantages stemming from its use, pump 12 will first be described as generally including a pump casing 14, which serves to define a pumping chamber 16 communicating with an inlet or suction opening 18 and an outlet or delivery opening, not shown, via a discharge space 20, an impeller 22 mounted within pumping chamber 16 by a drive shaft 24 for rotation about an axis essentially coincident with the axis of inlet opening 18, and a suitable stuffing box/bearing unit shown in part at 26 for sealing against/rotatably supporting shaft 24.

The specific design of the several elements comprising pump 12 will depend upon its intended use. Typically, however, impeller 22 would include a plurality of pumping vanes 28, which project forwardly of the front surface of the impeller and have their leading or forward edges interconnected by a shroud 30 to define internal channels 32 serving to pump fluid between the casing inlet and outlet openings incident to rotation of the impeller.

Various types of front sealing devices may be employed to prevent or retard leakage of pressurized pump fluid from discharge area 20 towards inlet opening 18 through the space 34 bounded by casing front wall 36 and shroud 30. As by way of illustration, such front sealing device may simply comprise cooperating, facing, radially disposed annular surfaces 38 and 40 defined by shroud 30 and casing front wall 36, respectively. Alternatively, such front sealing device may be defined by fitting impeller shroud 30 with front pump out vanes shown in broken line at 42 as having front edge surfaces 44 intended to cooperate with an annular surface area 46 of casing front wall 36 to establish a leakage opposing pressure condition adjacent the outer periphery of the shroud.

When pump 12 is intended for use in pumping fluids containing abrasive materials, it is common practice to provide suitable impeller adjustment means, such as may be provided for by axial shifting of the bearing housing supporting the pump drive shaft or defined in part by a threaded connection 48 between impeller 22 and drive shaft 24, for selectively, adjustably moving or displacing the impeller axially towards inlet opening 18, as required to compensate for the wearing away of cooperating surfaces of the front sealing device, which would otherwise result in rendering such sealing device progressively less efficient and eventually inoperative for sealing purposes.

The hydrodynamic seal 10 of the present invention will now be described as generally comprising a vortex chamber or channel 50, which is arranged essentially concentrically of the rotational axis of impeller 22 and to open into pumping chamber 16 through casing rear wall 52, and a repeller 54, which is carried by the rear surface or wall 56 of impeller 22 and positioned within the vortex chamber in a manner tending to produce or create a toroidal flow of fluid therewithin incident to rotation of the impeller. More specifically, vortex chamber 50 is defined by radially inner and outer cylindrical surfaces 58 and 60, respectively, which are disposed essentially concentrically of the rotational axis of impeller 22, and an annular surface 62, which is concave and arranged to join or extend between surfaces 58 and 60. Surface 62 is preferably provided with a circular sectional configuration having a center of curvature designated as 64 in FIG. 1.

Repeller 54 is shown in FIG. 1 as being defined by an annular rib 66, which is disposed concentrically of the rotational axis of impeller 22 and arranged to project rearwardly of impeller rear surface 56, and a plurality of repeller blades 68, which are disposed to extend rearwardly of rib 66. Preferably rib 66 and blades 68 are formed integrally with impeller 22 incident to the mold forming thereof.

To facilitate reference to the drawings and the following description, the letters "D" and "d" are employed in FIG. 1 to designate the outer and inner diameters of rib 66 and blades 68, "a" to designate a reference axial spacing between impeller rear wall 56 and casing rear wall 52, or between the center of curvature 64 of surface 62 and the rear edges 70 of the blades, "t" to designate the axial depth of vortex chamber 50, and "s" to designate the radial gap or spacing between the vortex chamber and the repeller.

Figure 2:
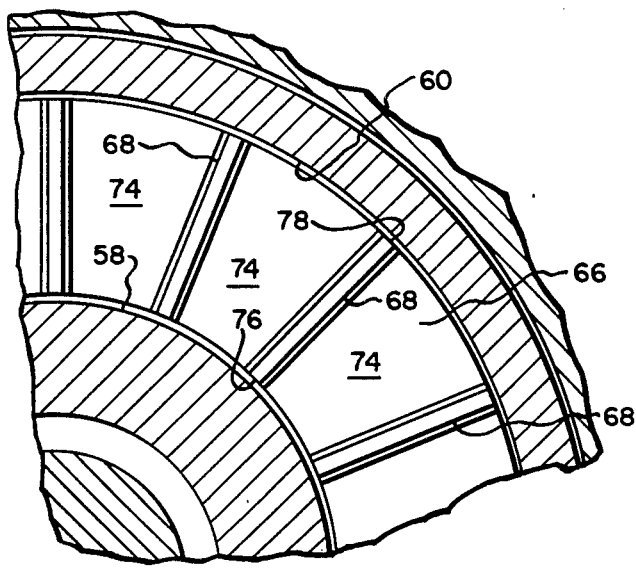
FIG. 2 is a sectional view taken generally along the line 2—2 in FIG. 1.
Figure 3A:
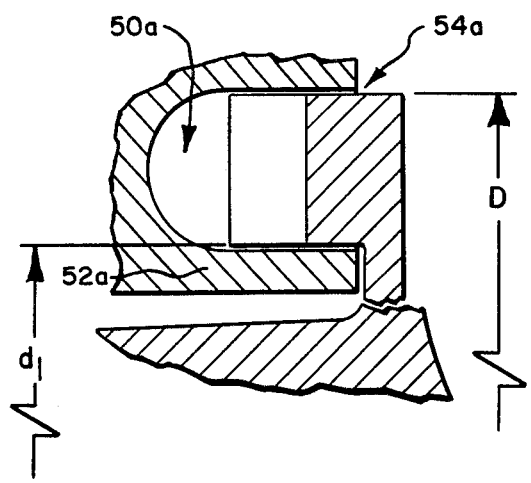
FIGS. 3a through 3e are sectional views illustrating alternative embodiments of the seal shown in FIG. 1.

Blades 68 may have various configurations, such as those commonly used in connection with conventional rear pump out blade designs, but same are preferably formed as flat, relatively thin blades and arranged to lie within radial planes passing lengthwise through the rotational axis of impeller 22, as best shown in FIG. 2. Also, blades 68 are preferably of rectangular configuration, when viewed within the planes in which they lie, as best shown in FIG. 1. An advantage of this construction is that a range of repeller sizes, such as those designated as 54a, 54b and 54c in FIGS. 3a, 3b and 3c, respectively, may be formed from a single casting having initial outer and inner rib/blade diameters "D" and "d" by the expedient of machining same to remove material from the radially inner surfaces of rib 66 and blades 68 to provide increased rib/blade diameters "$d_1$", "$d_2$" and "$d_3$". Correspondingly sized vortex chambers 50a, 50b and 50c would be defined by separately cast rear wall casings 50a, 52b and 52c or, if desired, by selectively machining a single casting initially formed with a relatively small vortex chamber corresponding in size for instance to chamber 50c.

During operation of pump 12, pump fluid of a liquid or gaseous nature within vortex chamber 50 is forced to move radially outwardly towards outer wall 60 within passages 74 bounded by blades 68, due to the energy gradient established by the difference in peripheral velocities of the inner and outer edges 76 and 78, respectively, of the blades. Fluid exiting from the outer ends of blade passages 74 serves to energize fluid in the open portion 80 of vortex chamber 50, which extends between blade rear edges 70 and chamber rear wall 62, thereby resulting in a radially inwardly directed flow of fluid within open portion 80 for reentry into the inner ends of blade passages 74. This generally radially directed fluid circulation pattern, which is indicated by arrows 82 in FIG. 1, is enhanced by the concave curvature of chamber rear wall 62.

It will be understood that circulation pattern 82 is superimposed on a peripherally or annularly directed fluid circulation pattern, which results from the rotation movement of blades 68, so as to produce a toroidal flow of fluid within chamber 50. The high energy field thus created adjacent the periphery of impeller 22 establishes a hydrodynamic seal tending to prevent the flow of high pressure pump fluid from discharge space 20 between casing rear wall 52 and impeller rear wall 56 inwardly towards drive shaft 24.

A series of tests were conducted on various repeller/vortex chamber configurations of a repeller having diameter "D" equal to 16 inches to determine the effects of parameters "d", "b", "t", "s" and "a" on the static pressure coefficient of the repeller, as defined by the equation $$\psi_p = \frac{gh_e}{u^2} = \frac{g(h_c - h_s)}{u^2},$$

wherein g is the gravitational constant, $h_e$ is the pressure developed by the repeller, $h_c$ is the pressure in the casing, $h_s$ is the pressure in the stuffing box and u is peripheral velocity of the repeller. As by way of example, for a repeller of the design illustrated in FIG. 1 having values of "d"=8.00 inches, "b"=1.18 inches, "t"=5.62 inches and "s"=0.06 inch, axial excursions of the repeller through values of "a"=0, 0.31 and 0.62 inch resulted in repeller pressure coefficients of 0.375, 0.369 and 0.371, respectively. As values of "b" were increased with other variables remaining constant, corresponding increases in repeller pressure coefficient were noted, until for "b"=2.00 inches, wherein axial excursions of "a"=0 and 0.62 inch resulted in repeller pressure coefficients of 0.397 and 0.385.

Figure 3B:
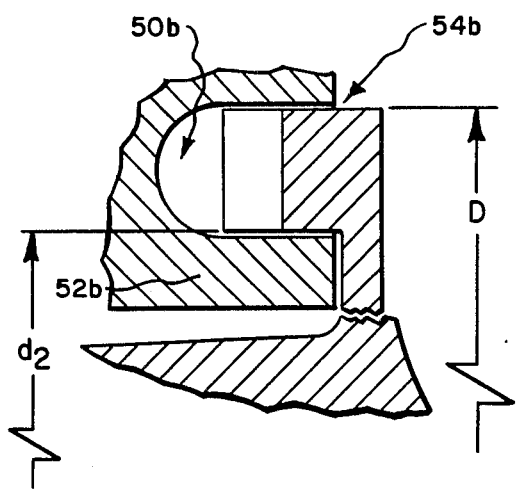
Figure 3C:
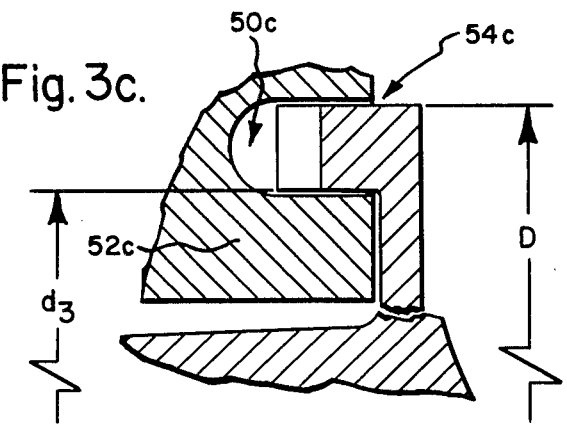
Figure 3D:
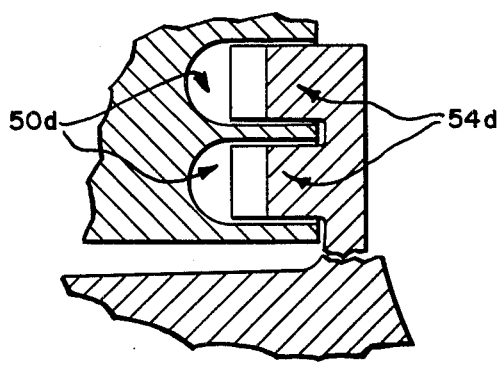
Figure 3E:
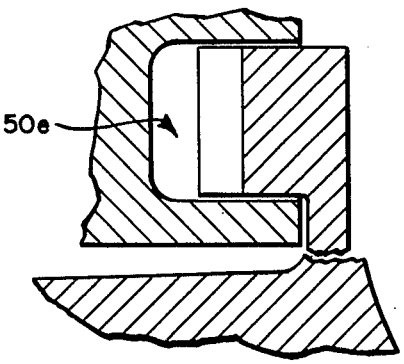

Tests to determine the effects of both axial excursions and radial gap on repeller pressure coefficient were conducted with a modified vortex chamber 50e of the semielliptical type shown in FIG. 3e with constant values of "d"=8.00 inches, "b"=1.18 inches, "t"=3.75 inches for various values of "s" between 0.06 inch and 0.62 inch. For a value of "s"=0.06 inch, values of "a"=0, 0.31 and 0.62 inch resulted in pressure coefficients of 0.381, 0.380 and 0.382, respectively, whereas for the value of "s"=0.62 inch, values of "a"=0, 0.31 and 0.62 inch resulted in pressure coefficients of 0.395, 0.395 and 0.396, respectively. While tests with this semielliptical configuration appear to produce slightly higher pressure coefficients than those obtained from the same repeller and a semi-circular chamber, the latter design is presently preferred in that it is believed to require less shaft horse power to operate a desired efficiency. However, the vortex chamber design illustrated in FIG. 3e does have the advantage of permitting a reduction in the overall axial length of the seal.

Tests conducted on repellers having increased values of "d", such as that illustrated as $d_2$ and $d_3$ in FIGS. 3b and 3c, resulted in reduction in the values of pressure coefficient for each value of "a", but as in prior tests demonstrated that such pressure coefficients are essentially independent of axial excursions up to "a"=0.62 inch.

A two-stage vortex cavity/repeller construction of the type designated 50d and 54d in FIG. 3d was designed and tested in case tests with previously mentioned single-stage construction showed signs of hydrodynamic instability of partially filled vortex chambers. In that tests conducted with the single-stage construction indicated that same were stable under all conditions, this two-stage construction is not required and otherwise deemed undesirable due to its complex design.

Mechanical constraints of the test equipment did not allow testing of the effect of axial excursions "a" beyond 0.625 inch. However, in that no downward trend in the values of pressure coefficient was noted within the test range, it would appear reasonable to assume that a measurable or significant deterioration in performance would not be encountered within an expected operating range of the seal limited by the partial withdrawal of the repeller blades from within the vortex chamber, such that the desired toroidal flow pattern within the vortex chamber would be degraded or destroyed.

The demonstrated insensitivity of the present hydrodynamic seal to both initial axial and radial gaps between its cooperating elements is particularly advantageous in that the facing surfaces of such elements need not be machined or otherwise formed to the same tolerance or initially positioned with the same degree of accuracy at the time of manufacture, as was previously required for seals defined by known pump out or back blades. Thus, the present seal provides for a substantial reduction in the initial cost of any given pump without loss in operating efficiency of its rear seal. The ability of the present seal to withstand growth in radial gap between its elements has the additional advantage that its operation is not adversely effected by the wearing away of the inner and outer edges of the repeller blades and/or inner and outer walls of the vortex chamber, due to contact thereof with abrasive material, which may be carried by the pump fluid.

The insensitivity of the present seal to changes in the axial gap between its elements over a range which is substantially greater than that which would render inoperable seals defined by known pump out or back blades, particularly lends the present invention for use in pumps intended for abrasive fluid applications, wherein a pump impeller must undergo frequent axial adjustments to accommodate for the wearing away of the pump front seal. Moreover, it is contemplated that by properly selecting the values of such variables as "b" and "t" in relation to the thickness of the repeller rib of the seal of the present invention, same may be rendered effective for sealing purposes through the whole of the typical design range of impeller adjustment or design range of axial thickness reduction of the front sealing means of a pump.

The present hydrodynamic seal is capable of producing a "dry" seal, wherein the static pressures generated by impeller vanes 28 and repeller 54 are equal, for suction or inlet pressures at or below atmospheric pressure. For suction pressures exceeding atmospheric pressure, the maintenance of a "dry" seal would require that the diameter of impeller vanes 28 be reduced relative to repeller 54, as indicated by broken line 28' in FIG. 1, such as by performing a machining operation on the outer edges of the impeller vanes and the periphery of shroud 30. Unlike prior seals, the seal of the present invention will permit axial adjustments of an impeller for wear compensating purposes, while retaining "dry" seal operating conditions.

The present seal is equally adapted for use in pump designs in which the seal is intended only for use in decreasing the pressure of pump fluid on the stuffing box.

The invention has been described with reference to both a preferred embodiment and certain presently anticipated alternative embodiments, but it is not intended to so limit the scope of protection on the invention.

What is claimed is:

1. A fluid pump comprising a casing means defining a pumping chamber in communication with a fluid inlet opening and a fluid outlet opening, and an annular vortex chamber opening into said pumping chamber; an impeller rotatably supported within said pumping chamber and having pumping vanes on a front surface thereof for pumping fluid between said inlet and outlet openings incident to rotation of said impeller, said vortex chamber is bounded by outer and inner walls disposed essentially concentrically of the rotational axis of said impeller and an annular wall joining ends of said outer and inner walls arranged remotely of said pumping chamber, wherein said vortex chamber opens axially relatively towards a rear surface of said impeller; and a repeller mounted for rotation with said impeller adjacent said rear surface, and said repeller is received within said vortex chamber and cooperates therewith for creating a toroidal flow of fluid within said vortex chamber incident to rotation of said impeller to provide a hydrodynamic seal, said repeller comprising a plurality of blades cooperating to define flow passages extending between radially outer and inner ends thereof and having rearwardly disposed edges spaced from said annular wall surface to axially bound therebetween an open portion of said vortex chamber, said open portion is free of any internal obstruction which might impede said toroidal flow of fluid, and means extending into said vortex chamber for limiting flow communication between said open portion and said pumping chamber to outer and inner flow passageways arranged adjacent said outer and inner walls and extending axially past said radially outer and inner ends of said blades, respectively, in a direction towards said pumping chamber.

2. A fluid pump comprising a casing means defining a pumping chamber in communication with a fluid inlet opening and a fluid outlet opening, and an annular vortex chamber opening into said pumping chamber; an impeller rotatably supported within said pumping chamber and having pumping vanes on a front surface thereof for pumping fluid between said inlet and outlet openings incident to rotation of said impeller, said vortex chamber is disposed essentially concentrically of the rotational axis of said impeller and opens relatively towards a rear surface of said impeller; and a repeller mounted for rotation with said impeller adjacent said rear surface, said repeller is received within said vortex chamber and cooperates therewith for creating a toroidal flow of fluid within said vortex chamber incident to rotation of said impeller to provide a hydrodynamic seal, and said repeller comprises an annular rib disposed concentrically of said rotational axis and arranged to project rearwardly of said rear surface and a plurality of blades arranged to project rearwardly of said annular rib, and both said annular rib and said blades are received within said vortex chamber.

3. A fluid pump according to claim 2, wherein said vortex chamber includes an annular wall surface disposed concentrically of said rotational axis and in a facing relationship to rearwardly disposed free edges of said blades, and said annular wall surface is concave.

4. A fluid pump according to claim 3, wherein said annular surface is of essentially circular sectional configuration.

5. A fluid pump according to claim 3, wherein said annular surface is of essentially semielliptical sectional configuration.

6. A fluid pump according to claim 3, wherein said annular rib and said blades have an outer diameter equal to or exceeding an outer diameter of said impeller pumping vanes.

7. A liquid pump comprising a casing means defining a pumping chamber in communication with a fluid inlet opening and a fluid outlet opening, and an annular vortex chamber opening into said pumping chamber; an impeller rotatably supported within said pumping chamber and having pumping vanes on a front surface thereof for pumping fluid between said inlet and outlet openings incident to rotation of said impeller, said vortex chamber is disposed essentially concentrically of the rotational axis of said impeller and opens relatively towards a rear surface of said impeller, said vortex chamber includes radially inner and outer surfaces disposed essentially concentrically of said rotational axis and an annular surface extending radially between said inner and outer surfaces; and a repeller mounted for rotation with said impeller adjacent said rear surface, said repeller is received within said vortex chamber and cooperates therewith for creating a toroidal flow of fluid within said vortex chamber incident to rotation of said impeller to provide a hydrodynamic seal, and said repeller comprises an annular rib disposed concentrically of said rotational axis and to extend rearwardly of said rear surface of said impeller and a plurality of blades disposed to extend rearwardly of said annular rib, and both said annular rib and said blades extend radially intermediate said inner and outer surface.

8. A fluid pump according to claim 7, wherein said annular surface is a concave surface of circular sectional configuration.

9. A fluid pump according to claim 7, wherein said annular surface is a concave surface of semielliptical sectional configuration.

10. A fluid pump according to claim 7, wherein said blades lie within planes passing lengthwise through said rotational axis and are of rectangular configuration, when viewed within said planes in which they lie.

11. A fluid pump according to claim 10, wherein said annular rib and said repeller blades have an outer diameter equal to or exceeding an outer diameter of said pumping vanes.

12. A fluid pump according to claim 11, wherein said annular surface is a concave surface of circular sectional configuration.

13. A fluid pump according to claim 11, wherein said annular surface is a concave surface of semielliptical sectional configuration.

14. An improvement for use in a liquid pump of the type adapted for use in pumping abrasive liquids and comprising a pump casing defining a pumping chamber communicating with an inlet and with an outlet extending generally radially outwardly of an axis located concentrically of said inlet, and a first annular sealing means disposed concentrically outwardly of said inlet; an impeller supported within said pumping chamber for driven rotation about a rotational axis essentially coincident to said axis, said impeller including vanes projecting from a front surface thereof relatively towards said inlet for pumping liquids through said pumping chamber between said inlet and said outlet incident to rotation of said impeller, a second annular sealing means arranged for operative association with said first sealing means, and repeller means projecting from a rear surface of said impeller for cooperation with a rear wall of said pumping chamber facing towards said inlet for maintaining a static pressure rearwardly of said impeller and radially inwardly of said repeller means less than that created by said vanes adjacent radially outer ends thereof; and additional means for moving said impeller axially thereof relatively towards said inlet to accommodate for the wearing away of said first and/or second sealing means, as required to maintain such sealing means in operative association, the improvement comprising in combination:

an annular vortex chamber opening axially into said pumping chamber through said rear wall concentrically of said axis, said vortex chamber having facing inner and outer generally cylindrical walls joined at ends thereof remotely from said pumping chamber by a concave wall, said outer wall is disposed radially outwardly of radially outer ends of said impeller vanes, said repeller means projects into said vortex chamber and cooperates therewith to establish a toroidal flow of liquid within said vortex chamber incident to rotation of said impeller for maintaining said static pressure essentially constant incident to a relatively wide range of movement of said impeller towards said inlet and said repeller comprises a plurality of blades extending into said vortex chamber and having rearwardly disposed edges spaced from said concave wall to axially bound an open portion of said vortex chamber extending radially between said inner and outer walls, said open portion is free of any internal obstruction projecting from any of said inner and outer walls and said concave wall and means defining inner and outer annular surfaces arranged adjacent to and in facing relationship with said inner and outer walls axially intermediate said open portion and said pumping chamber, wherein said inner and outer surfaces cooperate with said inner and outer walls to bound inner and outer axially extending flow passageways extending between said open portion and said pumping chamber axially past radially inner and outer ends of said blades, respectively, and said range of movement is limited by withdrawal of said inner and outer surfaces from facing relationship with said inner and outer walls within said vortex chamber.

15. An improvement for use in a liquid pump of the type adapted for use in pumping abrasive liquids and comprising a pump casing defining a pumping chamber communicating with an inlet and with an outlet extending generally radially outwardly of an axis located concentrically of said inlet, and a first annular sealing means disposed concentrically outwardly of said inlet; an impeller supported within said pumping chamber for driven rotation about a rotational axis essentially coincident to said axis, said impeller including vanes projecting from a front surface thereof relatively towards said inlet for pumping liquid through said pumping chamber between said inlet and said outlet incident to rotation of said impeller, a second annular sealing means arranged for operative association with said first sealing means, and repeller means projecting from a rear surface of said impeller for cooperation with a rear wall of said pumping chamber facing towards said inlet for maintaining a static pressure rearwardly of said impeller and radially inwardly of said repeller means less than that created by said vanes adjacent radially outer ends thereof; and additional means for moving said impeller axially thereof relatively towards said inlet to accommodate for the wearing away of said first and/or second sealing means, as required to maintain such sealing means in operative association, the improvement comprising:

an annular vortex chamber disposed in said rear wall concentrically of said axis, said vortex chamber having concentrically associated inner and outer generally cylindrical walls joined by a concave wall, said outer wall is disposed radially outwardly of radially outer ends of said impeller vanes, said repeller means projects into said vortex chamber and cooperates therewith to establish a toroidal flow of liquid within said vortex chamber incident to rotation of said impeller for maintaining said static pressure essentially constant incident to a relatively wide range of movement of said impeller towards said inlet, and said repeller means includes an annular rib disposed concentrically of said axis to project from said rear surface of said impeller and repeller blades disposed to project rearwardly of said rib, said rib and said repeller blades project into said vortex chamber, said repeller blades lie within planes passing lengthwise through said rotational axis and have essentially rectangular configurations, when viewed within said planes.

16. The improvement according to claim 15, wherein said concave wall is of circular sectional configuration.

17. An improvement for use in a fluid pump of the type adapted for use in pumping abrasive fluids and comprising a pump casing defining a pumping chamber communicating with an inlet bounded by a first annular sealing surface and with an outlet extending generally radially outwardly of an axis located concentrically of said first sealing surface; an impeller supported within said pumping chamber for driven rotation about a rotational axis essentially coincident to said axis, said impeller including vanes projecting from a front surface thereof relatively towards said inlet for pumping fluid through said pumping chamber between said inlet and said outlet incident to rotation of said impeller, a second annular sealing surface arranged for operative association with said first sealing surface and repeller blades projecting from a rear surface of said impeller for cooperation with a rear wall of said pumping chamber facing towards said inlet for providing a rear pump seal for maintaining a pressure rearwardly of said impeller and radially inwardly of said repeller blades less than that created by said impeller vanes adjacent radially outer ends thereof; and means for moving said impeller axially thereof relatively towards said inlet to accommodate for the wearing away of said first and second sealing surfaces as required to maintain such sealing surfaces in operative association, the improvement for maintaining a dry seal adjacent the outer periphery of said impeller while accommodating for axial displacements of said repeller blades away from said rear wall of said pumping chamber incident to movements of said impeller relatively towards said inlet within the design limits of said impeller, said improvement comprising:

an annular vortex chamber disposed in said rear wall concentrically of said axis, said vortex chamber having concentrically associated inner and outer walls joined by a concave wall, said outer wall is disposed radially outwardly of radially outer ends of said impeller vanes, and said repeller blades project into said vortex chamber and cooperate therewith to create a toroidal liquid flow pattern therewithin incident to rotation of said impeller, characterized in that said vortex chamber and said repeller blades are shaped and sized to permit said flow pattern to establish a static pressure condition adjacent the periphery of said impeller, which is essentially equal to or greater than that established by operation of said impeller vanes, and essentially independent of axial movements of said impeller towards said inlet within the design limits of said impeller.

18. A fluid pump comprising a casing means defining a pumping chamber in communication with a fluid inlet opening and a fluid outlet opening, and an annular vortex chamber; an impeller roatably supported within said pumping chamber and having pumping vanes on a front surface thereof for pumping fluid between said inlet and outlet openings incident to rotation of said impeller, said vortex chamber is disposed essentially concentrically of the rotational axis of said impeller and opens through a rear surface of said pumping chamber relatively towards a rear surface of said impeller, said vortex chamber is bounded by facing outer and inner walls joined by an annular wall surface adjacent ends thereof disposed remotely of said rear surface of said pumping chamber; and a repeller mounted for rotation with said impeller adjacent said rear surface thereof and disposed within said vortex chamber to cooperate therewith to create a toroidal flow of fluid within said vortex chamber incident to rotation of said impeller for providing a hydrodynamic seal whose efficiency is essentially constant within a range of movement of said repeller away from said rear surface, said repeller comprising a plurality of blades projecting into said vortex chamber and having rearwardly disposed edges thereof cooperating with said annular wall surface to axially bound an open portion of said vortex chamber extending radially between said outer and inner walls, said open portion is free of any internal obstruction projecting from any of said outer and inner walls and said annular wall surface which might impede said toroidal flow of liquid, and means cooperating with said outer and inner walls to place said open portion in flow communication with said pumping chamber only along outer and inner paths extending axially therebetween and axially past radially outer and inner ends of said blades, respectively, and said range of movement is limited by withdrawal of the last said means from within said vortex chamber.

19. A fluid pump comprising a casing means defining a pumping chamber in communication with a fluid inlet opening and a fluid outlet opening, and an annular vortex chamber opening into said pumping chamber; an impeller rotatably supported within said pumping chamber and having pumping vanes on a front surface thereof for pumping fluid between said inlet and outlet openings incident to rotation of said impeller, said vortex chamber is disposed essentially concentrically of the rotational axis of said impeller and opens relatively towards a rear surface of said impeller; and a repeller mounted for rotation with said impeller adjacent said rear surface and disposed within said vortex chamber to cooperate therewith to create a toroidal flow of fluid within said vortex chamber incident to rotation of said impeller for providing a hydrodynamic seal whose efficiency is essentially constant within a range of movement of said repeller away from said rear surface, said repeller comprises an annular rib disposed concentrically of said rotational axis and arranged to project rearwardly of said rear surface and a plurality of blades arranged to project rearwardly of said annular rib, both said annular rib and said blades are disposed within said vortex chamber, and said range of movement is limited by withdrawal of said annular rib from within said vortex chamber.

20. A liquid comprising a casing means defining a pumping chamber in communication with a fluid inlet opening and a fluid outlet opening, and an annular vortex chamber opening into said pumping chamber; an impeller rotatably supported within said pumping chamber and having pumping vanes on a front surface thereof for pumping fluid between said inlet and outlet openings incident to rotation of said impeller, said vortex chamber is disposed essentially concentrically of the rotational axis of said impeller and opens relatively towards a rear surface of said impeller; and a repeller mounted for rotation with said impeller adjacent said rear surface and disposed within said vortex chamber to cooperate therewith to create a toroidal flow of fluid within said vortex chamber incident to rotation of said impeller for providing a hydrodynamic seal whose efficiency is essentially constant within a range of movement of said repeller away from said rear surface, said vortex chamber includes radially inner and outer surfaces disposed essentially concentrically of said rotational axis and a concave annular surface extending radially between said inner and outer surfaces, and said repeller comprises an annular rib disposed concentrically of said rotational axis and to extend rearwardly of said rear surface of said impeller and a plurality of blades disposed to extend rearwardly of said annular rib, and both said annular rib and said blades extend radially intermediate said inner and outer surfaces, rearwardly disposed edges of said blades are spaced from said concave annular surface to provide an open poriton of said vortex chamber and said range of movement is limited by withdrawal of said annular rib from within said vortex chamber.

21. A fluid pump according to claim 18, wherein said annular wall surface is of concave section, said outer and inner ends of said blades are disposed adjacent said outer and inner walls.

* * * * *